United States Patent

[11] 3,579,783

| [72] | Inventors | Edward J. Hayes<br>Ann Arbor;<br>Stephen E. Crick, Livonia, Mich. |
|---|---|---|
| [21] | Appl. No. | 742,590 |
| [22] | Filed | July 5, 1968 |
| [45] | Patented | May 25, 1971 |
| [73] | Assignee | Kelsey-Hayes Company<br>Romulus, Mich. |

[54] METHOD FOR MANUFACTURING WHEELS
26 Claims, 5 Drawing Figs.

[52] U.S. Cl. .................................................. 29/159,
29/159.1, 152/330
[51] Int. Cl. ...................................................... B21d 53/26,
B21k 1/28, B21k 1/42
[50] Field of Search .......................................... 29/159,
159.1; 152/330, (TS); 301/63, 65

[56] References Cited
UNITED STATES PATENTS
| 3,117,026 | 1/1964 | Spier | 118/215 |
|---|---|---|---|
| 3,357,747 | 12/1967 | Eldred | 301/63 |
| 3,369,843 | 2/1968 | Prew | 301/63 |
| 3,470,933 | 10/1969 | Molnar | 152/330 |

FOREIGN PATENTS
| 686,145 | 1/1953 | Great Britain | 152/T.S. |
|---|---|---|---|

*Primary Examiner*—John F. Campbell
*Assistant Examiner*—Victor A. D. Palma
*Attorney*—Harness, Dickey and Pierce ABSTRACT: A method and apparatus for manufacturing vehicle wheels wherein a structural adhesive material is applied to the rim bead seat section of the wheel rim while simultaneously rotating the wheel about its axis of rotation, the material being distributed over the bead seat section by means of a suitable tool disposed adjacent the wheel and adapted to engage the material upon rotation of the wheel, whereby the material forms a surface of constant radius from the rotational axis of the wheel and upon which an associated vehicle tire is adapted to be mounted.

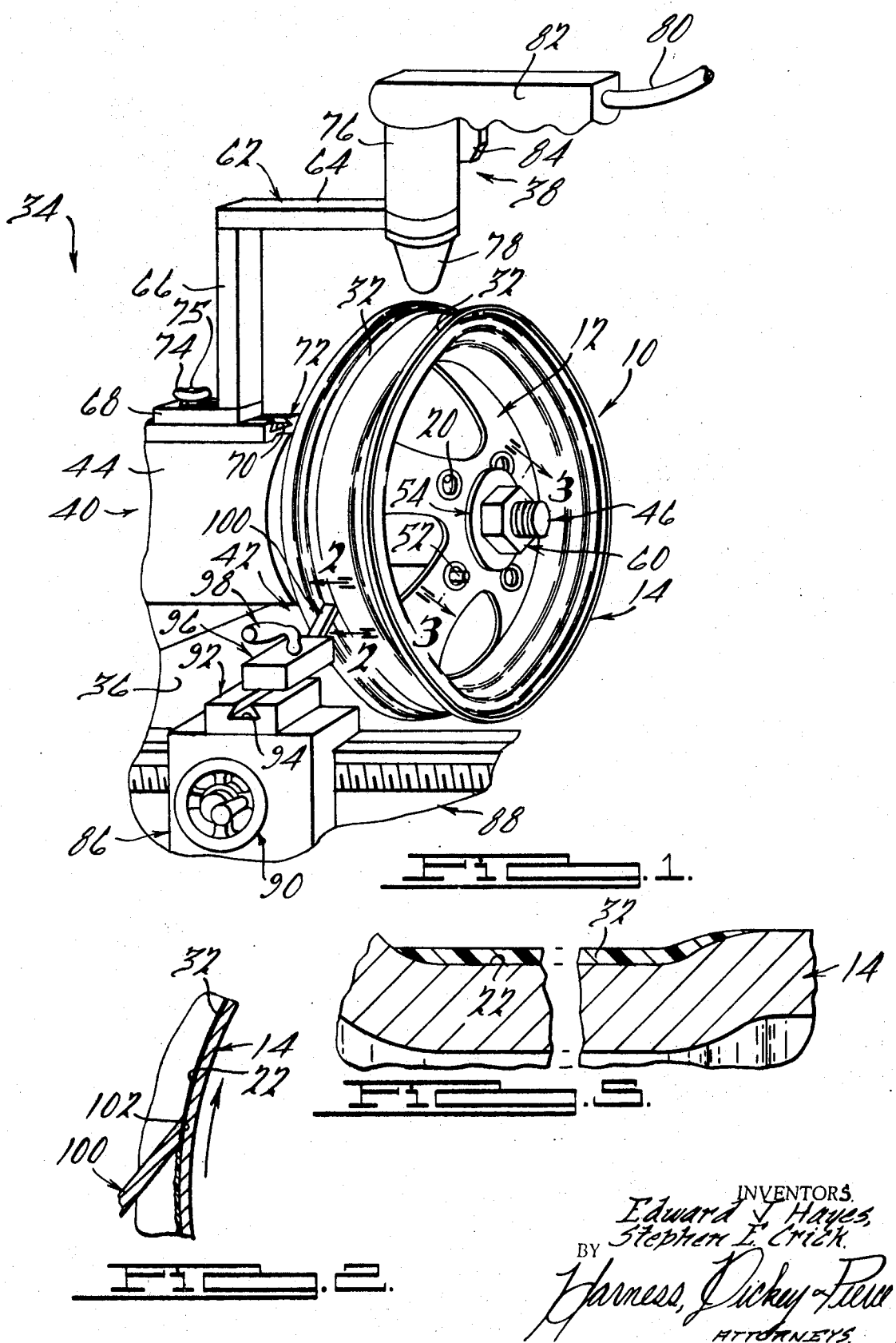

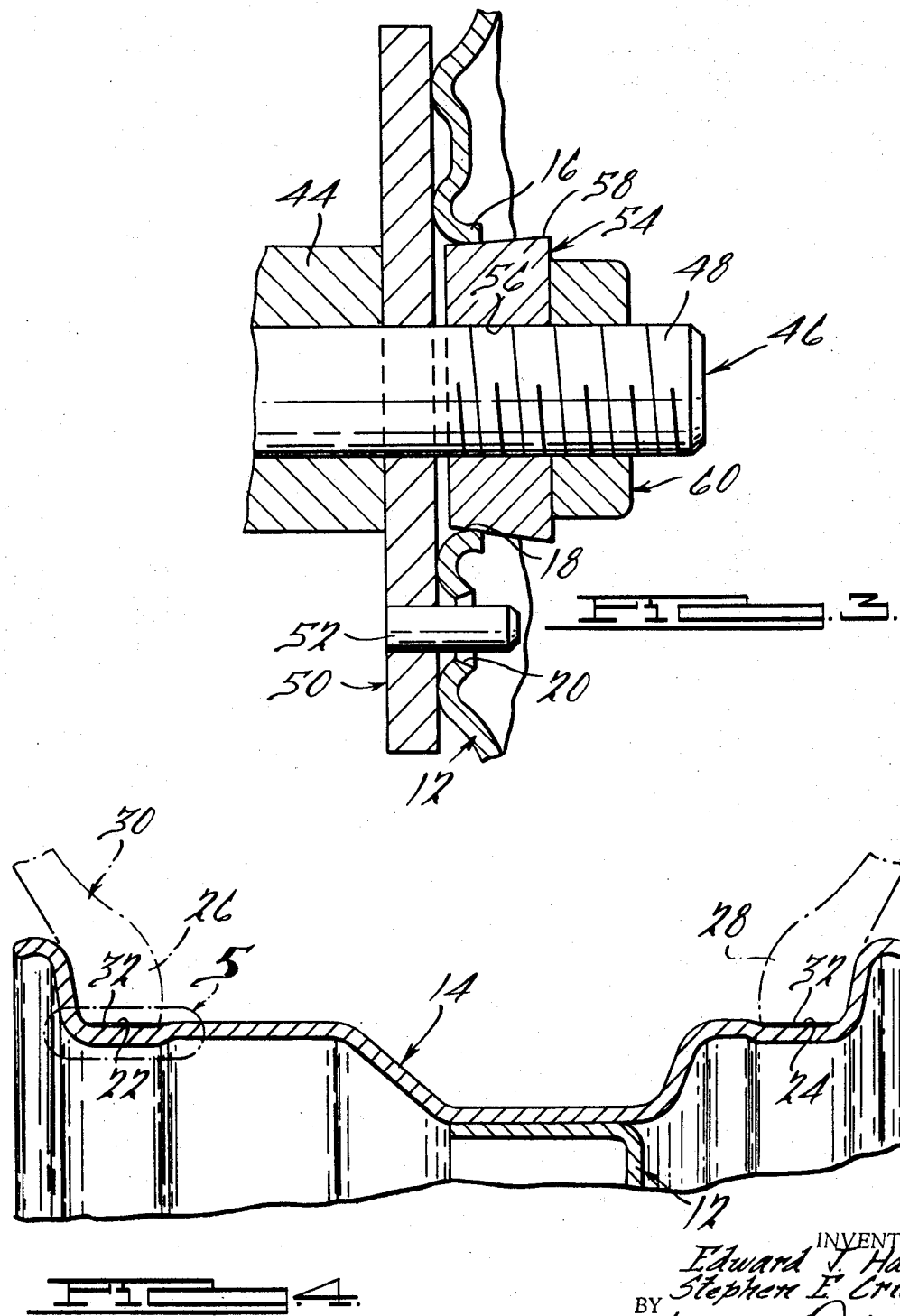

3,579,783

METHOD FOR MANUFACTURING WHEELS

BACKGROUND OF THE INVENTION

In the manufacture of wheels for automobile and similar type vehicles, it is the common practice to produce the wheel rims and wheel spiders in separate manufacturing operations and thereafter transport the rim and spider members to an assembly station where the spider members are operatively mounted within the rims and secured thereto as, for example, by spot welding or the like. This method of assembling the spider members within the wheel rims, together with the normal dimensional variations in the wheel rims has been found to introduce what is commonly known as "run-out" areas in the wheel rims which consist of certain circumferential portions of the wheel rim being of a slightly greater radius than other portions of the rims.

Due to the continuously increasing standards in the automotive industries in providing for comfortable riding characteristics in automotive vehicles, the aforementioned runout area in the vehicle wheels have been found to be objectionable from the standpoint that the variations in wheel radii cause undesirable vibration of the vehicle when the same is traveling at certain speeds over a roadway. The source of vibration originates initially from the fact that the vehicle tires assume an "out of round" condition due to the fact that the tire beads do not seat upon a truly round or circular surface on the wheel rims; hence, upon rotation of the wheels and tires, the aforementioned objectionable vibrations are produced which are transmitted to the vehicle and the passengers therewithin.

In order to obviate the aforementioned problems, various manufacturing techniques have been proposed which increase the accuracy in the production of the vehicle wheels; however, from the practical manufacturing cost standpoint, it is heretofore been impossible to manufacture a truly round wheel at a cost which is commensurate with the large volume of wheels mass produced for modern automobiles.

In accordance with the principles of the present invention, a new, improved and economical method and apparatus is provided for manufacturing vehicle wheels that have an extremely accurate degree of "roundness" or absence of eccentricity, with the result that the amount of vibration or other objectionable characteristics attendant similar type vehicle wheels heretofore known and used is minimized to the extreme. The principles of the present invention are carried out through the application of thin layer of a structural material around the rim bead seat sections of the vehicle wheels, which material, upon being applied to the wheel rims, is distributed so as to define surfaces having a constant or uniform radius from the center of rotation of the wheels, with the result that the bead sections of the associated tires will seat upon a truly circular surface so as to obviate the possibility of any objectionable vibrations being produced upon rotation of the wheel and tire on an automotive vehicle.

The structural material, in a preferred form of the present invention, consists of a thermosetting adhesive material which is applied to the wheel rims and properly distributed thereon preparatory to the wheels being given a protective coating of paint or similar material. Thereafter, the wheels may be painted and transferred to a suitable drying oven, furnace or the like, as is the common practice in the wheel manufacturing industries, at which time the paint is dried and the adhesive material is cured so as to become structurally rigid and positively bonded to the wheel rim.

SUMMARY OF THE INVENTION

This invention relates generally to vehicle wheels and, more particularly, to a new and improved method and apparatus for manufacturing wheels for automotive vehicles.

It is accordingly a general object of the present invention to provide a new and improved method and apparatus for manufacturing vehicle wheels.

It is a more particular object of the present invention to provide a method and apparatus of the above character for manufacturing wheels such that they will have accurately formed bead seat sections for operatively supporting the bead sections of associated vehicle tires.

It is another object of the present invention to provide a new and improved method of the above character which includes the step of applying a structural adhesive material to a wheel rim and thereafter effecting curing of the material and simultaneous drying of a protective coating of paint or the like on the wheel.

It is another object of the present invention wherein the structural material is distributed over a wheel rim so as to define a surface having a constant uniform radius with respect to the axis of rotation of the wheel.

It is yet another object of the present invention to provide a new and improved vehicle wheel which will feature improved riding characteristics.

It is a further object of the present invention to provide a new and improved method and apparatus of the above character which may be economically practiced commensurate with mass production techniques.

Other objects and advantages of the present invention will become apparent from the following detailed description, taken in conjunction with the accompanying drawings.

BRIEF DESCRIPTION OF THE DRAWINGS

FIG. 1 is an elevated perspective view of an exemplary apparatus for practicing the method of manufacturing vehicle wheels of the present invention;

FIG. 2 is an enlarged fragmentary cross-sectional view of a portion of the apparatus illustrated in FIG. 1, as taken substantially along the line 2–2 thereof;

FIG. 3 is an enlarged fragmentary cross-sectional view of a portion of the apparatus illustrated in FIG. 1, as taken substantially along the line 3–3 thereof;

FIG. 4 is an enlarged fragmentary cross-sectional view of a portion of the vehicle wheel manufactured in accordance with the principles of the present invention; and FIG. 5 is a five times enlarged view of the portion of the structure illustrated within the circle 5 of FIG. 4.

DETAILED DESCRIPTION OF THE INVENTION

Referring now to FIG. 1 of the drawings, vehicle wheel 10 is shown as comprising a central wheel spider member 12 having an annular wheel rim 14 extending therearound and secured thereto, as by spot welding or other methods well known in the art. The wheel spider member 12 is formed with a central axially extending flange section 16 (see FIG. 3), and with a central annular hub receiving opening 18 and a plurality of circumferentially spaced mounting stud receiving openings 20 which are disposed radially outwardly from the opening 18. As illustrated in FIG. 4, the wheel rim is of conventional shape and defines a pair of axially spaced circumferentially extending bead seat sections 22 and 24 that are adapted to receive and support the tire bead sections 26 and 28, respectively, of a conventional automotive vehicle tire, a portion of which is designated in phantom lines in FIG. 4 and designated by the numeral 30. As will hereinafter be described in detail, and in accordance with the principles of the present invention, the bead seat sections 22 and 24 of the wheel 10 are adapted to be provided with a layer of structural material, generally designated by the numeral 32, which functions to define accurate or truly circular surfaces adapted to receive and support the bead sections 26, 28 of the tire 30 in a manner so as to minimize to the extreme any eccentricity in the tire 30 upon mounting thereof on the wheel 10, hence minimized to the extreme the possibility of any road vibrations being produced upon rotation of the wheel 10 and tire 30.

A detailed description of the material 32 will be hereinafter described, but in general terms, said material 32 is adapted to be initially applied to the wheel rim 14 when the material 32 is in a generally puttylike consistency, whereby the material 32 may be extruded or similarly deposited onto the wheel rim 14 and thereafter be distributed over preselected areas of the bead seat sections 22, 24 by means of a suitable material distributing tool or the like. It will be readily apparent to anyone skilled in the art that the material 32 may be applied by a variety of different type devices, and that the apparatus hereinafter described is merely an exemplary construction of one type of such material applying devices. Accordingly, the hereinafter described construction and operation of an exemplary material applying apparatus is not intended to limit the broadest aspects of the present invention but is only disclosed herein for purposes of illustrating a typical apparatus for accomplishing the basic objects of the present invention.

Referring now to FIG. 1 of the drawings, an exemplary apparatus for applying the material 32 is generally designated by the numeral 34 and comprises a support structure 36 which is intended to be rigidly and fixedly mounted by any suitable means. The apparatus 34 comprises a material applicator section 38 for applying the material 32 to the wheel 10, a spindle or wheel support section 40 and a material distributing section 42 which is adapted to distribute the material 32 around the bead seat sections 22, 24 of the wheel rim 14 in a preselected manner. Generally speaking, the wheel support section 40 is adapted to support the wheel 10 and effect rotation thereof, the applicator section 38 is designed to apply the material 32 to the bead seat sections 22, 24 of the wheel 10 during rotation thereof, and the material distributing section 42 is adapted to effect proper distribution of the material 32 along the bead seat sections 22, 24 subsequent to the material 32 being deposited thereon.

Referring now in detail to the construction of the spindle or wheel support section 40 of the apparatus 34, as best illustrated in FIGS. 1 and 3, the section 40 is shown as comprising a generally horizontally disposed housing 44 adapted to journal support a horizontally disposed wheel support shaft 46 having an externally threaded outer end portion 48. The housing 44 is provided with suitable drive means (not shown) for effecting rotational movement of the shaft 46 at a preselected rotational speed, with the result that upon actuation of such drive means, the shaft 46 and wheel 10 adapted to be supported thereon will rotate in a predetermined manner. As illustrated in FIG. 3, the wheel 10 is adapted to be mounted on the end of the shaft 46 by having the shaft 46 extend through the central hub receiving opening 18 of the wheel spider 12. A suitable backing plate 50 is fixedly secured to the shaft 46 and is adapted to rotate therewith, and upon mounting the wheel 10 upon the shaft 46, the wheel is moved axially along the shaft 46 until the spider member 12 abuts against the plate 50. The plate 50 is provided with a drive pin 52 which is adapted to be received within one of the stud receiving openings 20 of the wheel spider member 12 when the wheel 10 is properly rotatably positioned upon the shaft 46. The wheel 10 is adapted to be detachably secured on the shaft 46 by means of a suitable wheel centering member 54 having an internally threaded bore 56 threadably mounted upon the shaft 46. The centering member 54 is formed with a generally tapered or frustoconically shaped outer surface 58 which is adapted to engage the periphery of the opening 18 of the wheel spider 12, whereby the wheel 10 is automatically centered with respect to the rotational axis of the shaft 46. A suitable locking nut 60 is also threadably received on he end portion 48 of the shaft 46 and adapted to be threadably advanced therealong so as to assure positive engagement of the centering member 54 with the wheel spider 12. It will be noted that for certain types of applications, instead of using the centering member 54 and lock nut 60, it may be desirable to mount a wheel on the apparatus 34 by means of one or more mounting studs and associated nuts (not shown), the former of which would project outwardly from the plate 50 and be received within the stud receiving openings of the wheel. Accordingly, it will be evident that the present invention is not limited to the specific construction of the apparatus 34 illustrated and described herein. In operation, it will be apparent that upon proper rotation of the shaft 46, the wheel 10 will rotate simultaneously therewith, with the pin 52 functioning to assure proper rotation of the wheel 10 along with the shaft 46 in the event there is any relative movement between the outer surface 58 of the centering member 54 and the periphery of the opening 18.

Referring now to the material applicator section 38 of the apparatus 34, as best seen in FIG. 1, the section 38 comprises a support bracket 62 having a generally horizontal extending portion 64 secured at one end to a vertically extending column 66. The lower end of the column 66 is affixed to the upper side of a support plate 68 which is provided with a conventional dove tail keyway (not shown) on the lower side thereof adapted to be slidably received within a suitable dove tail slot 70 formed in a mounting plate 72 on the upper side of the housing 44. As will be apparent, the support plate 68 is adapted to be slidably supported on the mounting plate 72 and thus is movable in a direction parallel to the axis of the shaft 46. Means in the form of a suitable locking nut 74 and associated stud 75 extending upwardly through the plate 68 are provided for fixedly securing the plate 68 to the mounting plate 72 at some preselected position thereon.

The outer end of the support bracket portion 64 is adapted to support a material applying nozzle assembly 76 having a generally vertically extending nozzle portion 78 adapted to deliver the material 32 to the wheel rim 14 when the wheel 10 is operatively mounted on the shaft 46. The assembly 76 comprises an internal reservoir containing the material 32 and an associated conduit 80 is provided which is communicable with a suitable source of pressurized air, which pressurized air upon actuation of the assembly 76 causes the material 32 to be discharged from the nozzle portion 78, as will later be described. The conduit 80 is communicable with a manually engageable pistol grip section 82 which is provided with an actuating trigger 84 or other suitable mechanism that may be conveniently actuated to effect the discharge of the material 32 from the assembly 76. In operation, the operator actuates the trigger 84 upon preselected rotative movement of the wheel 10 upon the shaft 46, with the result that the material 32 will be discharged from the nozzle 78 onto the bead seat sections 22, 24 of the wheel rim 14. As will be apparent, the support plate 68 and hence the entire support bracket 62 is initially positioned along the mounting plate 72 whereby the nozzle 78 is substantially vertically aligned or above one of the bead seat sections 22 or 24 so that the material 32 may be applied thereto in the manner later to be described. Thereafter, the support plate 68 is adjusted axially of the shaft 46 to a position wherein the nozzle 78 is substantially above the other of the bead seat sections 22 or 24 so that the material 32 may be applied thereto.

Referring now in detail to the construction of the material distributing section 42 of the apparatus 34, the section 42 comprises a carriage member 86 which is adapted to be supported for movement longitudinally of the shaft 46 by means of a suitable support structure 88. Means in the form of a suitable adjustment or transfer mechanism (not shown), adapted to be actuated by a suitable by a suitable manually engageable adjustment wheel or the like 90, is provided on the carriage member 86 and support structure 88, whereby the carriage member 86 may be positioned longitudinally along the support structure 88, in a manner well known in the art. The carriage member 86 is provided on the upper side thereof with a mounting plate 92 which defines a dove tail groove or slot 94 for slidably supporting a tool support block 96 for movement toward and away from the wheel 10 supported on the shaft 46. The support block 96 is provided with a suitable adjustment knob or locking lever 98 which may be adjustably positioned so as to lockingly secure the support block 96 at some preselected position along the slot 94, in a conventional manner. The support block 96 functions to operatively support a material distributing or "troweling" tool, generally designated 100, in a generally upwardly inclined position, as best seen in FIGS. 1 and 2. The tool 100 is provided with a generally vertically disposed troweling surface 102 on the end thereof which functions to distribute the material 32 over the bead seat sections 22, 24 of the wheel rim 14, as will hereinafter be described. It will be apparent, of course, that the support block 96 may be moved toward and away from the axis of the shaft 46 in accordance with the diameter of the wheel which is to have the material 32 applied thereto, whereby the apparatus 34 is universally applicable for applying the material 32 to various size automotive vehicle wheels. It will be noted that for certain types of application, the tool 100 may be provided with suitable heating means (not shown) if and when the material 32 is of the type which requires heating thereof in order to obtain the desired distribution and "-feathering" thereof over the bead seat sections 22, 24.

Generally speaking, when the material 32 is initially applied, it is best characterized as being of a somewhat puttylike consistency, as previously mentioned, whereby the material 32 may be extruded from the nozzle 78 onto the bead seat sections 22, 24 of the wheel 10 and thereafter be easily troweled or distributed over the sections 22, 24 with the material 32 thereafter being adapted to be subjected to a suitable operation for effecting curing or hardening and positive bonding thereof to the wheel rim 14. It will be readily apparent to those skilled in the art that the material 32 may be of various compositions; however, it has been discovered that epoxy base resins exhibit the most desirable characteristics insofar as ease of application and curing and positive adherence to the wheel rims. One particularly desirable epoxy base material which has been found to be especially acceptable for the present application is manufactured and distributed by 3—M Company and is identified as Structural Adhesive No. 2214this material being characterized by the following physical properties.

a. a viscosity of (Press Flow)@75° F. 300 sec., 20 grams, 50 p.s.i.
b. a cure cycle of 1. 40 min.@250° F.
   2. 30 sec@400° F.
c. a shear strength [PSI ASTM D—1002—64] aluminum FPL Etch 5000@75° F.

As previously mentioned, of course, various other types of materials, including materials of greater or lesser viscosity than the aforedescribed material 32, such as certain types of paints or the like, may be used instead of the aforementioned preferred material 32, and the present invention is not intended to be limited in its broadest aspects to the specific use of said material.

In operation of the apparatus 34, assuming the initial condition that the wheel 10 is properly mounted upon the shaft 46 with the centering member 54 properly positioning the wheel 10 coaxially of the rotational axis of the shaft 46, and further assuming that the nozzle 78 is properly aligned with one of the bead seat sections 22 or 24 of the wheel rim 14 and that the tool 100 is properly positioned with the same bead seat section, the apparatus 34 is initially energized so as to effect rotation of the shaft 46 and wheel 10 supported thereon. It has been found that the rotational speed of approximately 12 revolutions per minute is desirable when applying the material 32 to the wheel rim. After the wheel 10 has begun to rotate, the trigger 84 is actuated so as to effect the dispensing of the material 32 from the nozzle 78, whereupon the material 32 is discharged or extruded in the form of a generally cylindrical or other suitably shaped strip along the bead seat section with which the nozzle 78 is aligned. It will be apparent, of course, that the quantity of material 32 which is applied to the wheel 10 may be selectively controlled by varying the speed of rotation of the wheel 10 as the material 32 is applied thereto. As the wheel 10 rotates, the material 32 is distributed or troweled by means of the surface 102 of the tool 100 so as to cover the entire bead seat section. In a preferred operation, the tool 100 is adjusted relative to the periphery of the wheel rim 14 such that the surface 102 peripherally engages the portion of the wheel rim having the greatest or maximum runout radius, with the result that a minimum amount of material 32 will be applied to the maximum runout area since the tool 100, upon rotation of the wheel 10, will trowel or scrape virtually all of the material 32 off from the maximum runout areas and cause this material to be distributed to the portions of the wheel 10 having a radius of less than the radius of the maximum runout area.

By virtue of the fact that the tool 100 is fixed and the wheel 10 is rotated about its true rotational axis, the surface 102 of the tool 100 will effect distribution of the material 32 so that the material 32 will provide a cylindrical outer surface having a constant or uniform radius from the true center of rotation of the wheel 10, and since the tool 100 is initially positioned so that the surface 102 peripherally engages the maximum runout area of the wheel 10, the radius of the aforesaid cylindrical surface defined by the material 32 is equal to the radius of the maximum runout area of the wheel.

After the material 32 has been thus applied to one of the bead seat sections 22 or 24, the nozzle assembly 76 and tool 100 are properly adjusted axially or longitudinally of the shaft 46 so as to be aligned with the other of the bead seat sections. Thereafter, the above procedure may be repeated so as to apply the material 32 to the other of the bead seat sections 22, 24.

In the event the material 32 consists of the aforementioned thermosetting type epoxy base material, after the material 32 has been applied in the above described manner, it is necessary that said material 32 be subjected to a temperature controlled environment wherein the material 32 will be heated a predetermined amount and thus cured, with such curing causing the material 32 to become rigid in character and positively bonded to the wheel rim 14. It will be readily apparent, of course, that the heating of the material 32 may be achieved in a number of different ways as, for example, transferring the entire wheel 10 to a temperature controlled baking oven or furnace.

In accordance with one of the principles of the present invention, in the manufacture of the wheel 10, after the material 32 has been duly applied and distributed thereon the wheel 10 is transferred to a work station wherein a protective coating of paint or other material is applied to the wheel, after which time the thus painted wheel 10 may be transferred to a suitable baking or drying oven wherein the paint will become dried and the material 32 will simultaneously become cured due to the elevated temperature within the oven. By thus having the wheel 10 painted subsequent to the material 32 being applied to the wheel rim 14, thereof, the simultaneous drying of the paint and curing of the material 32 will effect a considerable saving in manufacturing procedures and hence reduce the production costs of the wheel 10.

It will be seen from the foregoing description that the present invention provides a wheel 10 wherein the bead seat sections 22, 24 thereof will define cylindrical surfaces having constant or uniform radii from the center of rotation of the wheel, with the result that when the associated tire 30 is mounted upon the wheel 10, road vibrations will be minimized to the extreme due to the absence of any eccentricity in the periphery of the wheel 10. Accordingly a smooth and comfortable ride will be enjoyed by the passengers of the associated automotive vehicle and tire wear will be minimized to the extreme.

While it will be apparent that the preferred embodiment illustrated herein is well calculated to fulfill the objects above stated, it will be appreciated that the present invention is susceptible to modification, variation and change without departing from the proper scope or fair meaning of the subjoined claims.

We claim:

1. In the method of manufacturing vehicle wheels comprising a preformed metallic annular wheel rim, the steps which include
   applying a layer of structural material around a portion of the wheel rim, and
   providing relative movement between the wheel rim and a material distributing means and thereby distributing the material on the wheel rim so as to define a surface of uniform radius from the center of rotation of the wheel.

2. The method as set forth in claim 1 which includes the step of applying a structural material having a puttylike consistency to the rim bead seat section of the wheel.

3. The method as set forth in claim 1 which includes the steps of applying a thermosetting type structural material to the wheel rim, and thereafter subjecting the material to a temperature controlled environment to effect curing thereof.

4. The method as set forth in claim 3 which includes the step of heating the entire wheel after the material has been applied thereto to effect curing of said material.

5. The method as set forth in claim 1 which includes the step of initially applying the material to the wheel rim in the form of a cylindrical extruded strip, thereafter distributing said material over the rim bead seat section of the wheel rim by means of rotating the wheel in the presence of a material distributing tool, providing a protective coating on the wheel subsequent to applying said material thereto and finally simultaneously drying said protective coating and curing said material.

6. The method as set forth in claim 1 wherein the wheel rim upon manufacture thereof, has maximum runout areas, which includes the step of applying the material to the wheel rim in a manner such that the radius of said surface is no greater than the radius of the maximum runout area of the wheel rim, which includes the step of initially applying the material to the wheel rim in the form of a cylindrical extruded strip, thereafter distributing said material over the rim bead seat section of the wheel rim by means of rotating the wheel in the presence of a material distributing tool, providing a protective coating on the wheel subsequent to applying said material thereto, and thereafter simultaneously drying said protective coating and curing said material.

7. The method as set forth in claim 1 wherein the wheel rim upon manufacture thereof, has maximum runout areas and which includes the step of applying the material to the wheel rim in a manner such that the radius of said surface is no greater than the radius of the maximum runout area of the wheel rim, which includes the step of initially applying the material having puttylike consistency to the wheel rim in the form of a cylindrical extruded strip and thereafter distributing said material over the rim bead seat section of the wheel rim by means of rotating the wheel around its axis of rotation in the presence of a material distributing tool, which includes the step of providing a protective coating on the wheel subsequent to applying said material thereto, and thereafter simultaneously drying said protective coating and curing said material.

8. In the method of manufacturing vehicle wheels comprising a spider member and an annular wheel rim defining a rim bead seat section, the steps which include rotating the wheel at a preselected rate about its rotational axis, applying a material to the bead seat section, forming the material so as to define a surface of constant radius from the center of rotation of the wheel, and curing the material whereby by the same will become a rigid structural portion of the wheel.

9. The method as set forth in claim 15 wherein said spider member comprises a central hub receiving opening, and which includes the step of rotating the wheel about the center of said openings.

10. The method as set forth in claim 8 wherein the step of forming the material consists of rotating the wheel adjacent a material forming tool, whereby the material will assume a predetermined configuration on the rim bead seat section of the wheel rim.

11. The method as set forth in claim 8 which includes the step of providing a protective coating on the wheel subsequent to applying said material thereto, and thereafter simultaneously drying said protective coating and curing said material.

12. The method as set forth in claim 8 which includes the step of initially applying the material to the wheel rim in the form of a cylindrical extruded strip and thereafter distributing said material over the rim bead seat section of the wheel rim by means of rotating the wheel in the presence of a material distributing tool supported adjacent the wheel rim.

13. The method as set forth in claim 8 which includes the step of applying a structural material having a puttylike consistency to the rim bead seat section of the wheel.

14. The method as set forth in claim 8 wherein the wheel rim upon manufacture thereof, has maximum runout areas, and which includes the step of applying the material to the wheel rim in a manner such that the radius of said surface is no greater than the radius of the maximum runout area of the wheel rim.

15. The method as set forth in claim 8 wherein the wheel rim upon manufacture thereof, has maximum runout areas, which includes the step of applying the material to the wheel rim in a manner such that the radius of said surface is no greater than the radius of the maximum runout area of the wheel rim, which includes the step of initially applying the material to the wheel rim in the form of a cylindrical extruded strip, thereafter distributing said material over the rim bead seat section of the wheel rim by means of rotating the wheel in the presence of a material distributing tool, providing a protective coating on the wheel subsequent to applying said material thereto, and thereafter simultaneously drying said protective coating and curing said material.

16. The method as set forth in claim 8 wherein the wheel rim upon manufacture thereof, has maximum runout areas and which includes the step of applying the material to the wheel rim in a manner such that the radius of said surface is no greater than the radius of the maximum runout area of the wheel rim, which includes the step of initially applying the material having a puttylike consistency to the wheel rim in the form of a cylindrical extruded strip and thereafter distributing said material over the rim bead seat section of the wheel rim by means of rotating the wheel around its axis of rotation in the presence of a material distributing tool, which includes the step of providing a protective coating on the wheel subsequent to applying said material thereto, and thereafter simultaneously drying said protective coating and curing said material.

17. In the method of manufacturing vehicle wheels comprising an annular wheel rim, the steps which include applying a layer of structural material around a portion of the wheel rim, arranging the material on the wheel rim by rotating the wheel around its axis of rotation simultaneously as the layer of material is applied thereto so as to define a surface of uniform radius from the center of rotation of the wheel.

18. In the method of manufacturing vehicle wheels comprising an annular wheel rim, the steps which include applying a layer of thermosetting structural material around a portion of the wheel rim, arranging the material on the wheel rim so as to define a surface of uniform radius from the center of rotation of the wheel, providing a protective coating on the wheel, and simultaneously drying said coating and curing said material.

19. In the method of manufacturing vehicle wheels comprising an annular wheel rim having runout areas, the steps which include applying a layer of structural material around a portion of the wheel rim, and arranging the material on the wheel rim so as to define a surface of uniform cylindrical surface the radius of which is no greater than the radius of the runout areas of the wheel rim.

20. In the method of manufacturing vehicle wheels comprising an annular wheel rim, the steps which include applying a layer of structural material in the form of an extruded strip around a portion of the wheel rim, and arranging the material on the wheel rim by rotating the wheel adjacent a material distributing tool, whereby the material is distributed over the rim bead seat of the wheel rim.

21. In the method of manufacturing vehicle wheels comprising an annular wheel rim having runout areas, the steps which include
applying a layer of structural material having a puttylike consistency around the rim bead seat of the wheel rim, and
arranging the material on the wheel rim so as to define a surface of uniform radius no greater than the radius of the maximum runout area of the wheel rim.

22. In the method of manufacturing vehicle wheels comprising an annular wheel rim, the steps which include
applying an extruded strip of structural material having a puttylike consistency around a portion of the wheel rim, and
arranging the material on the wheel rim by rotating the wheel adjacent a material distributing tool, whereby the material is distributed over the rim bead seat of the wheel rim.

23. In the method of manufacturing vehicle wheels comprising an annular wheel rim having runout areas, the steps which include
applying a layer of structural material around a portion of the wheel rim,
arranging the material on the wheel rim so as to define a surface of uniform cylindrical surface the radius of which is no greater than the radius of the runout areas of the wheel rim,
providing a protective coating on the wheel, and
simultaneously drying said coating and curing said material.

24. In the method of manufacturing vehicle wheels comprising an annular wheel rim, the steps which include
applying a layer of structural material in the form of an extruded strip around a portion of the wheel rim,
arranging the material on the wheel rim by rotating the wheel adjacent a material distributing tool, whereby the material is distributed over the rim bead seat of the wheel rim,
providing a protective coating on the wheel, and
simultaneously drying said coating and curing said material.

25. In the method of manufacturing vehicle wheels comprising an annular wheel rim, the steps which include
discharging a layer of structural material from a source thereof, and
providing relative movement between the wheel rim and the source of material and thereby applying the material to preselected areas of the wheel rim.

26. In the method of manufacturing vehicle wheels comprising an annular wheel rim, the steps which include
applying a layer of nonfabric, semiliquid flowable structural material around a portion of the wheel rim in a manner such that the material may be distributed around the wheel rim,
arranging the material when in its flowable condition around the wheel rim so as to define a surface of uniform radius from the center of rotation of the wheel.

UNITED STATES PATENT OFFICE
CERTIFICATE OF CORRECTION

Patent No. 3,579,783　　　　　　　　　　Dated May 25, 1971

Inventor(s) Edward J. Hayes and Stephen E. Crick

It is certified that error appears in the above-identified patent and that said Letters Patent are hereby corrected as shown below:

Column 3, line 62, "he" should read --the--. Column 4, line 57, delete "by a suitable" (second occurrence). Column 7, line 56, Claim 8, delete "by"; line 58, Claim 9, "15" should read --8--.

Signed and sealed this 28th day of December 1971.

(SEAL)
Attest:

EDWARD M. FLETCHER, JR.　　　　ROBERT GOTTSCHALK
Attesting Officer　　　　　　　　Acting Commissioner of Patents HKM/rg